US008994628B2

(12) United States Patent
Kang et al.

(10) Patent No.: US 8,994,628 B2
(45) Date of Patent: Mar. 31, 2015

(54) DISPLAY APPARATUS

(75) Inventors: Shin Tack Kang, Yongin-si (KR); Gyutae Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 345 days.

(21) Appl. No.: 13/448,137

(22) Filed: Apr. 16, 2012

(65) Prior Publication Data

US 2013/0147698 A1 Jun. 13, 2013

(30) Foreign Application Priority Data

Dec. 8, 2011 (KR) ........................ 10-2011-0131153

(51) Int. Cl.
*G02F 1/1343* (2006.01)
*G09G 3/36* (2006.01)

(52) U.S. Cl.
CPC ............ *G09G 3/3648* (2013.01); *G09G 3/3674* (2013.01); *G09G 2300/0426* (2013.01); *G09G 2310/0283* (2013.01)
USPC ............................................ 345/87; 349/139

(58) Field of Classification Search
CPC . G09G 3/3607; G09G 3/3666; G09G 3/3688; G09G 2300/0426; G09G 2320/0209; G02F 1/1343; G02F 2001/134354
USPC ............... 345/93, 98–100; 349/139, 143, 144
See application file for complete search history.

(56) References Cited

U.S. PATENT DOCUMENTS

| | | | | |
|---|---|---|---|---|
| 6,429,842 | B1 | 8/2002 | Shin et al. | |
| 6,707,441 | B1 * | 3/2004 | Hebiguchi et al. | 345/92 |
| 8,513,665 | B2 * | 8/2013 | Park | 257/59 |
| 2004/0252249 | A1 * | 12/2004 | Hong | 349/37 |
| 2006/0164350 | A1 * | 7/2006 | Kim et al. | 345/87 |
| 2006/0284815 | A1 * | 12/2006 | Kwon et al. | 345/98 |
| 2010/0156954 | A1 * | 6/2010 | Kim et al. | 345/690 |

FOREIGN PATENT DOCUMENTS

| | | |
|---|---|---|
| JP | 06-035418 | 2/1994 |
| KR | 1020000039362 | 7/2000 |
| KR | 1020070120276 | 12/2007 |

* cited by examiner

*Primary Examiner* — Allison Johnson
(74) *Attorney, Agent, or Firm* — Innovation Counsel LLP

(57) ABSTRACT

A display apparatus includes a first sub-pixel and a second sub-pixel. The first sub-pixel and the second sub-pixel are electrically and respectively connected to a first gate line and a second gate line adjacent to each other and are electrically connected to a data line. The display apparatus further includes a connection line disposed between sub-pixel electrodes of the first and second sub-pixels. The connection line has two ends connected to the data line and serves as an additional or alternative path for transmitting a data signal that is transmitted by the data line.

18 Claims, 7 Drawing Sheets

DISPLAY APPARATUS

CROSS-REFERENCE TO RELATED APPLICATION

This application claims priority to and benefit of Korean Patent Application No. 10-2011-0131153 filed on Dec. 8, 2011, the contents of which are incorporated herein by reference.

BACKGROUND

1. Field of the Invention

The present invention relates to a display apparatus. More particularly, the present invention relates to a display apparatus having improved display quality.

2. Description of Related Art

A typical liquid crystal display includes a plurality of pixels, each of which has a pixel electrode and a common electrode. The pixel electrode and the common electrode are applied with voltages that are different from each other. The liquid crystal display controls a light transmittance of a liquid crystal layer according to an electric field formed between the pixel electrode and the common electrode, thereby displaying a desired image. The pixels are arranged in a matrix having rows and columns.

The liquid crystal display includes a plurality of signal lines disposed on a substrate to apply signals to the pixel electrodes. Recently, the line width of the signal lines tends to be made small so as to improve an aperture ratio. As a result, the signal lines may be prone to damage, causing defects in the liquid crystal display.

In order to improve a display quality, voltages having different polarities (with reference a voltage applied to the common electrode) are alternately applied to each pixel column. In addition, pixel columns adjacent to each other are applied with voltages having polarities different from each other (with reference to the voltage applied to the common electrode).

However, the voltages applied to damaged or broken signal lines may undesirably affect the voltages charged in the pixel electrodes, causing reduction in display quality and occurrence of vertical line pattern phenomenon.

SUMMARY

One or more embodiments of the present invention are related a display apparatus capable of preventing image defects that are conspicuous to the user of the display apparatus and capable of providing desirable display quality.

An embodiment of the invention is related to a display apparatus that includes a plurality of gate lines including a first gate line and a second gate line neighboring the first gate line.

The display apparatus further includes a plurality of data lines crossing the gate lines, insulated from the gate lines, and including a first data line and a second data line neighboring the first data line.

The display apparatus further includes a plurality of pixels that includes a first pixel. The first pixel includes a first sub-pixel and a second sub-pixel. The first sub-pixel includes a first sub-pixel electrode. The second sub-pixel includes a second sub-pixel electrode. Both the first sub-pixel electrode and the second sub-pixel electrode are disposed between the first gate line and the second gate line in a plan view of the display apparatus and are disposed between the first data line and the second data line in the plan view of the display apparatus. The first sub-pixel is electrically connected to each of the second gate line and the first data line. The second sub-pixel is electrically connected to each of the first gate line and the first data line.

The display apparatus further includes a connection line electrically connected to each of the first data line, the first sub-pixel, and the second sub-pixel. At least a portion of the connection line is disposed between the first sub-pixel electrode and the second sub-pixel electrode in the plan view of the display apparatus.

In one or more embodiments, the first sub-pixel further includes a first transistor electrically connected to the first sub-pixel electrode, the second gate line, and the first data line; the second sub-pixel further includes a second transistor electrically connected to the second sub-pixel electrode, the first gate line, and the first data line.

In one or more embodiments, the display apparatus further includes a common electrode facing the first sub-pixel electrode and the second sub-pixel electrode; the display apparatus further includes a liquid crystal layer disposed between the first sub-pixel electrode and the common electrode and between the second sub-pixel electrode and the common electrode.

In one or more embodiments, the first transistor comprises a first source electrode connected to the first data line and a first drain electrode spaced apart from the first source electrode and electrically connected to the first sub pixel electrode, and the second transistor comprises a second source electrode connected to the first data line and a second drain electrode spaced apart from the second source electrode and electrically connected to the second sub pixel electrode.

In one or more embodiments, the connection line electrically connects the first source electrode and the second source electrode to each other.

In one or more embodiments, the first source electrode comprises a first branch portion extending in a first direction and a first electrode portion connected to the first branch portion and adjacent to the first drain electrode, the second source electrode comprises a second branch portion extending in the first direction and a second electrode portion connected to the second branch portion and adjacent to the second drain electrode, and the connection line electrically connects the first electrode portion and the second electrode portion to each other.

In one or more embodiments, the first sub-pixel electrode is disposed between the first branch portion and the second branch portion in the plan view of the display apparatus.

In one or more embodiments, the plurality of data lines further includes a third data line and a fourth data line, and a fifth data line sequentially disposed following the first data line and the second data line. The plurality of pixels further includes a second pixel, a third pixel, and a fourth pixel. The second pixel includes a third sub-pixel and a fourth sub-pixel each having a sub-pixel electrode disposed between the second data line and the third data line. The third pixel includes a fifth sub-pixel and a sixth sub-pixel each having a sub-pixel electrode disposed between the third data line and the fourth data line. The fourth pixel includes a seventh sub-pixel and an eighth sub-pixel each having a sub-pixel electrode disposed between the fourth data line and the fifth data line. The third sub-pixel and the fourth sub-pixel are electrically connected to the second data line. The fifth sub-pixel and the sixth sub-pixel are electrically connected to the third data line. The seventh sub-pixel and the eighth sub-pixel are electrically connected to the fourth data line.

In one or more embodiments, each of the first sub-pixel, the fourth sub-pixel, and the seventh sub-pixel includes a first-color filter (e.g., a red filter) and is electrically connected to the second gate line.

In one or more embodiments, each of the second sub-pixel, the fifth sub-pixel, and the eighth sub-pixel includes a second-color filter (e.g., a green filter) and is electrically connected to the first gate line.

In one or more embodiments, each of the third sub-pixel and the sixth sub-pixel includes a third-color filter (e.g., a blue filter), the third sub-pixel is electrically connected to the first gate line, and the sixth sub-pixel is electrically connected to the second gate line.

In one or more embodiments, the plurality of gate lines further includes a third gate line and a fourth gate line sequentially disposed following the first gate line and the second gate line. The plurality of pixels further includes a fifth pixel that includes a ninth sub-pixel and a tenth sub-pixel each having a sub-pixel electrode disposed between the first data line and the second data line and between the third gate line and the fourth gate line. Each of the ninth sub-pixel and the tenth sub-pixel is electrically connected to the second data line. The ninth sub-pixel includes a corresponding first-color filter (e.g., a red filter) and is electrically connected to the fourth gate line. The tenth sub-pixel includes a corresponding second-color filter (e.g., a green filter) and is electrically connected to the third gate line.

In one or more embodiments, in a first frame the first data line receives a first data voltage having a first polarity, and in the first frame the second data line receives a second data voltage having a second polarity different from the first polarity.

In one or more embodiments, in a second frame following the first frame the first data line receives a third data voltage having the second polarity, and in the second frame the second data line receives a fourth data voltage having the first polarity.

In one or more embodiments, the display apparatus includes a first gate driver that outputs a gate signal to the first gate line, a second gate driver that outputs the gate signal to the second gate line, a data driver that applies the data voltage to the first data line and the second data line, and a timing controller that outputs a gate control signal to the first and second gate drivers and outputs an image signal and a data control signal to the data driver.

In one or more embodiments, the first gate driver comprises at least one stage circuit to apply the gate signal to the first gate line, and the second gate driver comprises at least one stage circuit to apply the gate signal to the second gate line.

In one or more embodiments, a distance between the first sub-pixel electrode and the connection line is longer than a distance between the second sub-pixel electrode and the connection line in a plan view of the display apparatus.

In one or more embodiments, a distance between the first sub-pixel electrode and the first data line is longer than a distance between the second sub-pixel electrode and the second data line.

In one or more embodiments, the display apparatus includes a signal line that includes a portion of the first data line and encloses the first sub-pixel in a plan view of the display apparatus. The signal line may include the aforementioned connection line. According to embodiments of the invention, even if section of the first data line neighboring the first sub-pixel is damaged or broken, the connection may serve as a bypass to transmit the desired data signal and may prevent a line defect that is visible to the user. Advantageously, an image with desirable quality may be displayed.

In one or more embodiments, parasitic capacitances generated between sub-pixel electrodes and the data lines may be uniformly controlled and/or minimized. Advantageously, the display apparatus may display images with desirable gray-scales.

In one or more embodiments, the connection line connected to the first data line may substantially reduce the equivalent resistance of the first data line. Advantageously, data signals may be optimally transmitted, and the power consumption of the display apparatus may be minimized.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
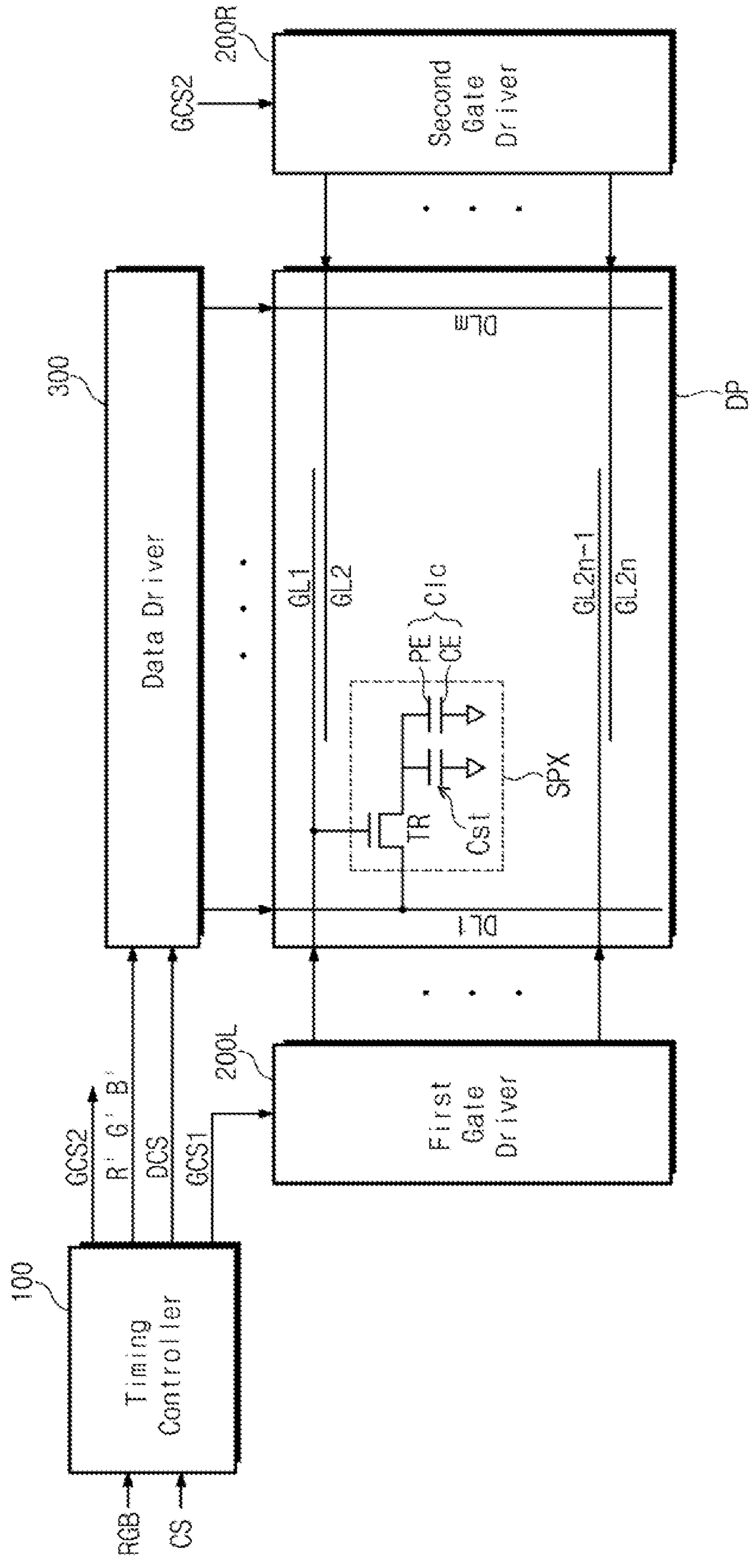
FIG. 1 is a block diagram illustrating a display apparatus according to an embodiment of the present invention.

It will be understood that when an element or layer is referred to as being "on", "connected to" or "coupled to" another element or layer, it can be directly disposed on, connected to, or coupled to the other element or layer, or one or more intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
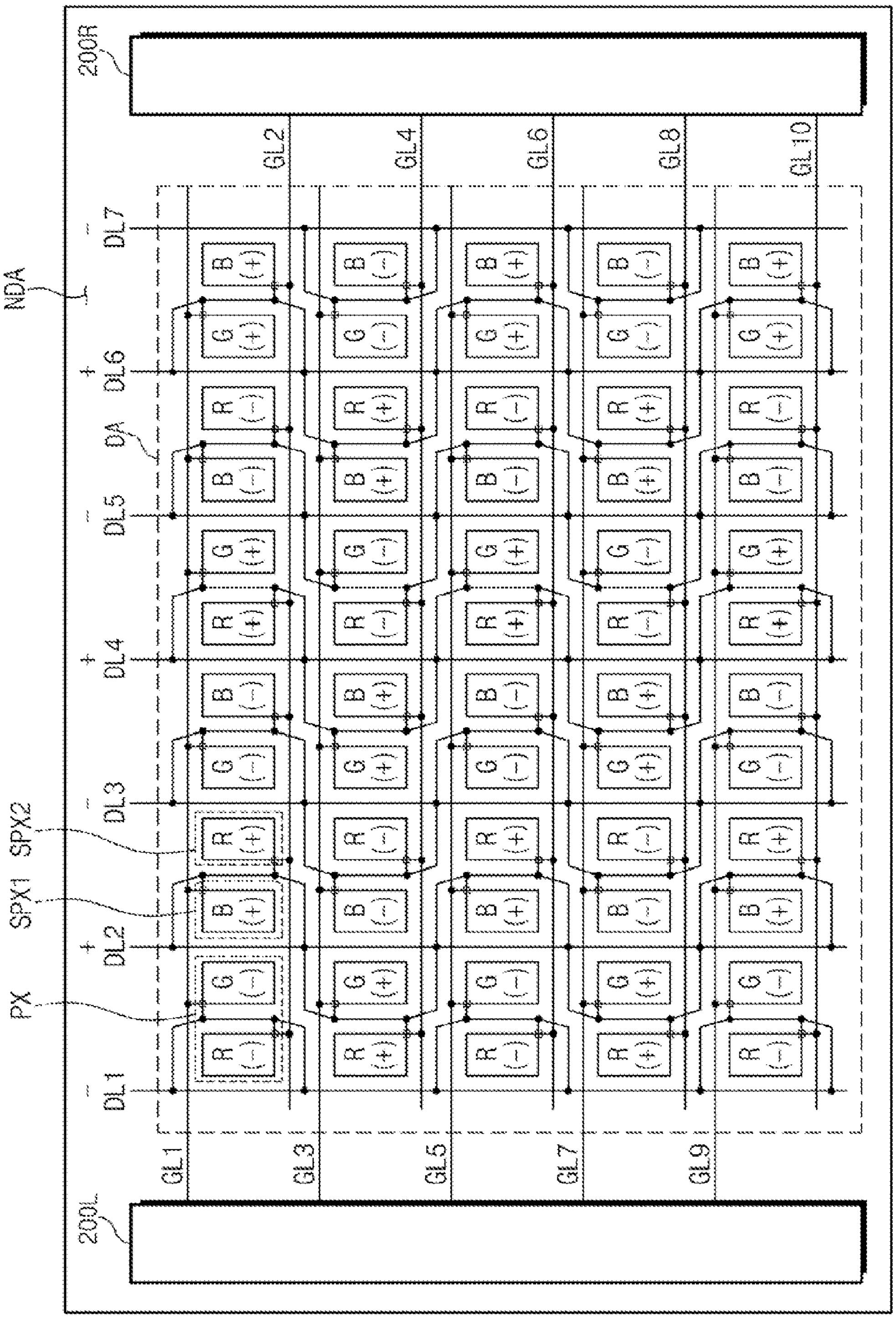
FIG. 2 is a plan view illustrating a display panel shown in FIG. 1.
Figure 3:
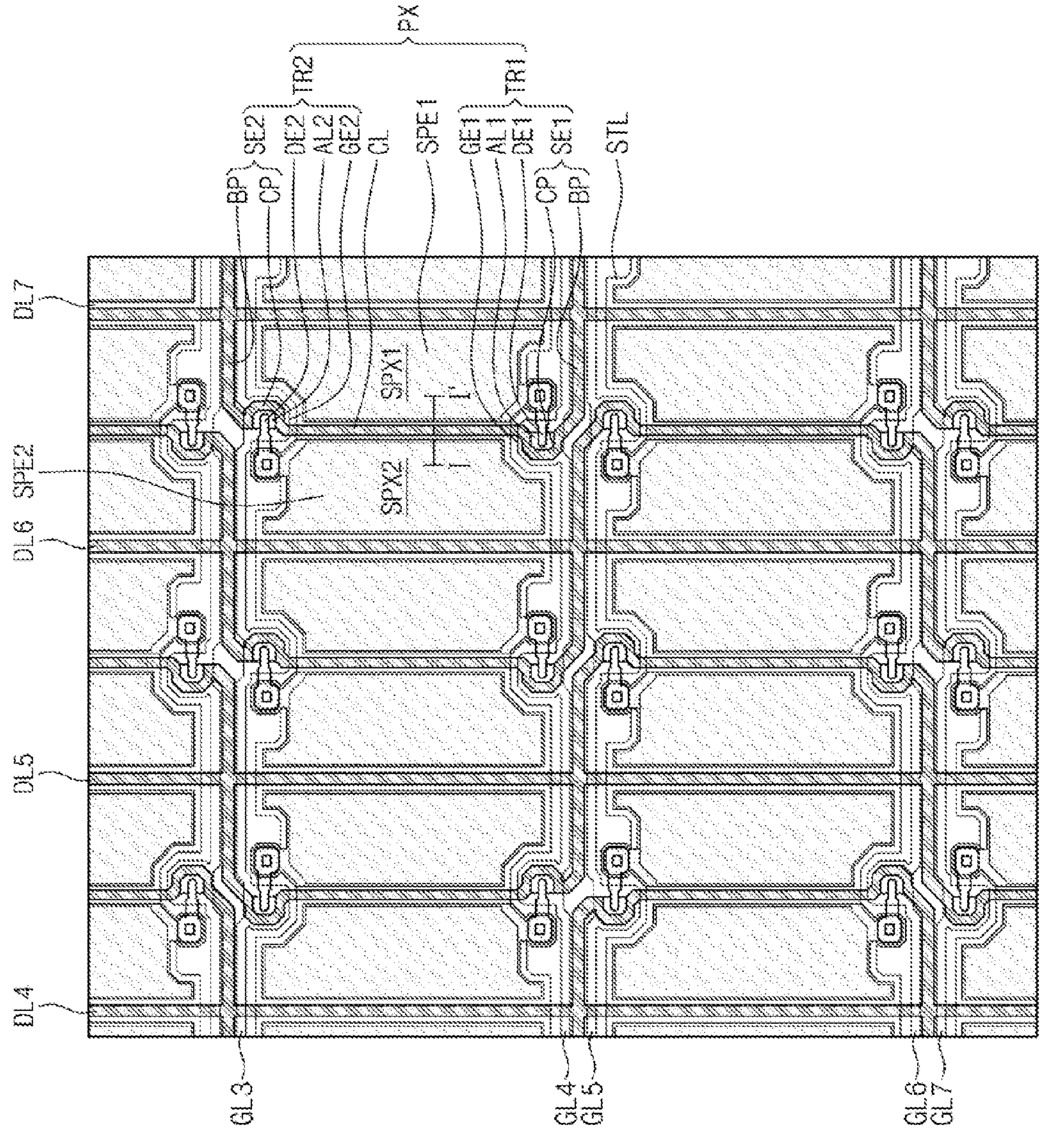
FIG. 3 is a plan view illustrating a portion of the display panel shown in FIG. 2.
Figure 4:
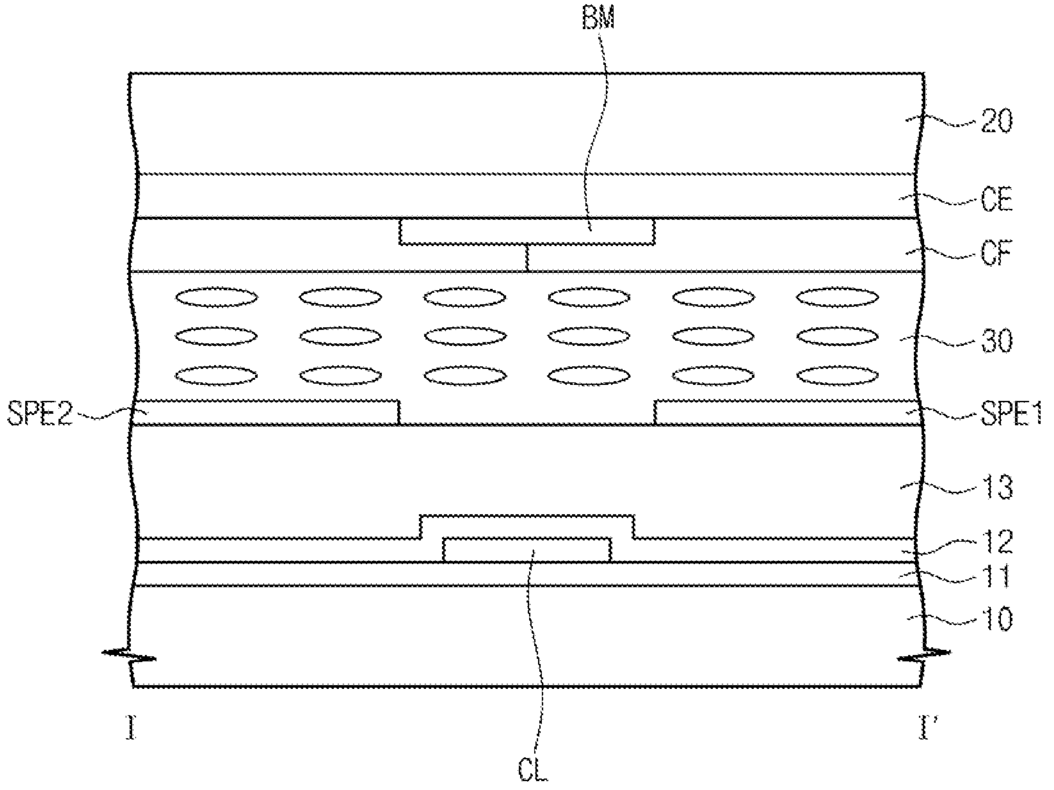
FIG. 4 is a cross-sectional view taken along a line I-I' shown in FIG. 3.

FIG. 1 is a block diagram illustrating a display apparatus according to an embodiment of the present invention, FIG. 2 is a plan view illustrating a display panel shown in FIG. 1, FIG. 3 is a plan view illustrating a portion of the display panel shown in FIG. 2, and FIG. 4 is a cross-sectional view taken along a line I-I' shown in FIG. 3.

As illustrated in FIG. 1, a display apparatus includes a display panel DP, a timing controller 100, first and second gate drivers 200L and 200R, and a data driver 300. Although not shown in FIG. 1, the display apparatus may include a backlight unit (not shown) to supply a light to the display panel DP.

The timing controller 100 receives image signals RGB and control signals CS from an external source outside of the display apparatus. The timing controller 100 converts a data format of the image signals RGB into a data format appropriate to an interface between the data driver 300 and the timing controller 100 and provides the converted image signals R'G'B' to the data driver 300. In addition, the timing controller 100 applies data control signals DCS, such as an output start signal, a horizontal start signal, a polarity inverting signal, etc., to the data driver 300.

The timing controller 100 applies gate signals GCS1 and GCS2, such as a first clock signal, a second clock signal, a start signal, a gate-off voltage, etc., to the first and second gate drivers 200L and 200R, respectively. In the present embodiment, the first clock signal includes a high period and a low period, which are repeated continuously, and the second clock signal has a phase opposite to that of the first clock signal. In addition, the first clock signal applied to the second gate driver 200R has a phase delayed with respect to the phase of the first clock signal applied to the first gate driver 200L.

The first and second gate drivers 200L and 200R output gate signals in response to the gate control signals GCS1 and GCS2, respectively.

The data driver 300 converts the image signals R'G'B' into data voltages in response to the data control signals DCS provided from the timing controller 100 and outputs the data voltages. The data voltages are applied to the display panel DP.

Hereinafter, the display panel DP will be described in detail with reference to FIGS. 1 to 4. For illustrating details inside the display panel DP, in FIGS. 2 and 3, a second substrate has been omitted.

As shown in FIGS. 1-4, a first plurality of lines extending in a first direction and a second plurality of lines extending in a second direction crossing the first direction are disposed on the first substrate 10. The first plurality of lines is insulated from the second plurality of lines. In the present embodiment, the first plurality of lines are referred to as gate lines GL1 to GL2*n*, and the second plurality of lines are referred to as data lines DL1 to DLm. As an example, ten gate lines GL1 to GL10 and seven data lines DL1 to DL7 have been illustrated in FIG. 2.

The first substrate 10 includes a display area DA in which an image is displayed and a non-display area NDA disposed adjacent to at least a portion of the display area DA. A plurality of pixels PX is arranged in the display area DA.

Each of the pixels PX has two sub-pixel electrodes disposed between a (2n−1)th gate line and (2n)th gate line (n is a natural number) among the gate lines. In addition, each of the pixels PX is disposed between an (m)th data line and an (m+1)th data line (m is a natural number) among the data lines.

In other words, each the pixels PX has two sub-pixel electrodes disposed between an odd-numbered gate line and an even-numbered gate line following the odd-numbered gate line, but not disposed between an even-numbered gate line and the odd-numbered gate line following the even-numbered gate line. In one or more embodiments, each of the pixels PX has two sub-pixel electrodes disposed between an even-numbered gate line and an odd-numbered gate line following the even-numbered gate line, but not disposed between an odd-numbered gate line and the even-numbered gate line following the odd-numbered gate line Each of the pixels PX includes a first sub-pixel SPX1 and a second sub-pixel SPX2 spaced apart from the first sub-pixel SPX1. In FIG. 1, an equivalent circuit diagram of the first and second sub-pixels SPX1 and SPX2 has been shown. Each of the first sub-pixel SPX1 and the second sub-pixel SPX2 includes a transistor TR, a liquid crystal capacitor Clc, and a storage capacitor Cst.

In addition, as illustrated in FIGS. 2 and 3, each of the pixels PX includes a connection line CL disposed between the first sub-pixel SPX1 and the second sub-pixel SPX2. The connection line CL is electrically connected to the first sub-pixel SPX1 and the second sub-pixel SPX2 and electrically connected to the (m)th data line or the (m+1)th data line, to which the first sub-pixel SPX1 and the second sub-pixel SPX2 are connected.

Hereinafter, the first sub-pixel SPX1 and the second sub-pixel SPX2 will be described in detail with reference to FIGS. 2 to 4.

As illustrated in FIG. 3, the first sub-pixel SPX1 includes a first transistor TR1 connected to a corresponding one of the gate lines GL1 to GL2*n* and a corresponding one of the data lines DL1 to DLm. The first transistor TR1 outputs a data signal in response to the gate signal transmitted by the corresponding gate line.

The first transistor TR1 includes a first gate electrode GE1 branched from the corresponding one of the gate lines GL1 to GL2*n*. That is, the first gate electrode GE1 protrudes from the corresponding one of the gate lines GL1 to GL2*n* when viewed in a plan view of the display panel DP.

A storage line STL (illustrated in FIG. 3) is disposed on the same layer on which the gate lines GL1 to GL2*n* are disposed. The storage line STL receives a voltage at a level that is different from the data signal (or data voltage). The storage line STL, a first sub-pixel electrode SPE1, and an insulating layer disposed between the storage line STL and the first sub-pixel electrode SPE1 form the storage capacitor Cst (illustrated in FIG. 1).

A gate insulating layer 11 (illustrated in FIG. 4) is disposed on the first substrate 10 to cover the gate lines GL1 to GL2*n* and the first gate electrode GE1. The gate insulating layer 11 also covers the connection line CL.

The first transistor TR1 includes a first active layer AL1 disposed on the first gate electrode GE1, wherein the gate insulating layer 11 is disposed between the first active layer AL1 and the first gate electrode GE1. In a plan view of the display panel DP, the first active layer AL1 overlaps the first gate electrode GE1.

The data lines DL1 to DLm are disposed on the gate insulating layer 11. The first transistor TR1 includes a first source electrode SE1 branching from the corresponding one of the data lines DL1 to DLm. The first source electrode SE1 partially overlaps the first gate electrode GE1 and the first active layer AL1 when viewed in a plan view of the display panel DP.

In addition, the first transistor TR1 includes a first drain electrode DE1 spaced apart from the first source electrode SE1 when viewed in a plan view of the display panel DP. The first drain electrode DE1 also partially overlaps the first gate electrode GE1 and the first active layer AL1.

A protective layer 12 and a planarization layer 13 are sequentially disposed on the first substrate 10 to cover the first drain electrode DE1, the first source electrode SE1, and the data lines DL1 to DLm. The protective layer 12 or the planarization layer 13 may be omitted.

The first sub-pixel electrode SPE1 is disposed on the planarization layer 13. The first sub-pixel electrode SPE1 is connected to the first drain electrode DE1 through a contact hole formed through the protective layer 12 and/or the planarization layer 13. The first sub-pixel electrode SPE1 receives the data signal through the first drain electrode DE1.

The second substrate 20 includes color filters CF. The color filters CF may be disposed on the common electrode CE. The first sub-pixel electrode SPE1, the common electrode CE, and the liquid crystal layer 30 disposed between the first sub-pixel electrode SPE1 and the common electrode CE form the liquid crystal capacitor Clc. The color filter corresponding to the first sub-pixel SPX1 may have a color different from the color filter corresponding to the second sub-pixel SPX2.

In addition, a black matrix BM is disposed on the second substrate 20. The black matrix BM corresponds to the signal lines disposed on the first substrate 10. For example, the black matrix BM may overlap the connection line CL.

In the present embodiment, the color filters CF and the black matrix BM are disposed on the second substrate 20, but they should not be limited thereto or thereby. In one or more embodiments, the color filters CF and the black matrix BM may be disposed on the first substrate 10.

Hereinafter, connection relations between the first sub-pixel SPX1, the second sub-pixel SPX2, the connection line CL, the gate lines GL1 to GL2*n*, and the data lines DL1 to DLm will be described in detail.

The first sub-pixel SPX1 is electrically connected to the (2n−1)th gate line or the (2n)th gate line and is electrically connected to the (m)th data line or the (m+1)th data line. The description that the first sub-pixel SPX1 is connected to a gate line means that the first gate electrode GE1 is connected to the gate line, and the description that the first sub-pixel SPX1 is connected to a data line means that the first source electrode SE1 is connected to the data line.

The second sub-pixel SPX2 is electrically connected to a remaining one of the (2n−1)th gate line and the (2n)th gate line not electrically connected to the first sub-pixel SPX1 and is electrically connected to the (m)th data line or the (m+1)th data line electrically connected to the first sub-pixel SPX1.

That is, the first sub-pixel SPX1 and the second sub-pixel SPX2 are electrically connected to different successive (or neighboring) gate lines and are electrically connected to the same data line (which is one of the two successive data lines neighboring the pixel PX).

The connection line CL is electrically connected to the data line that is connected to both SPX1 and SPX2. In detail, the connection line CL electrically connects the first source electrode SE1 and a second source electrode SE2 to each other. Therefore, the connection line CL is electrically connected to the data line to which the first source electrode SE1 and the second source electrode SE2 are electrically connected.

For instance, referring to FIG. 3, the first source electrode SE1 and the second source electrode SE2 are connected to the seventh data line DL7. The connection line CL configured to connect the first source electrode SE1 and the second source electrode SE2 to each other is electrically connected to the seventh data line DL7. Thus, although the seventh data line DL7 is damaged at the right side of the first sub-pixel electrode SPE1, the data signal (or data voltage) may be applied to the lower portion of the display panel DP under the damage point through the connection line CL. Advantageously, the display apparatus may still normally display the image even though the data line is damaged.

In addition, when the seventh data line DL7 is not damaged, the connection line CL may serve as an additional path for transmitting the data voltage applied to the seventh data line DL7. Therefore, the connection line CL enables reduction of an equivalent resistance in the seventh data line DL7 between a point from which the second source electrode SE2 is branched from the seventh data line DL7 and a point from which the first source electrode SE1 is branched from the seventh data line DL7. Advantageously, the line width of the seventh data line DL7 may be reduced, and the aperture ratio of the display apparatus may be improved.

Figure 7:
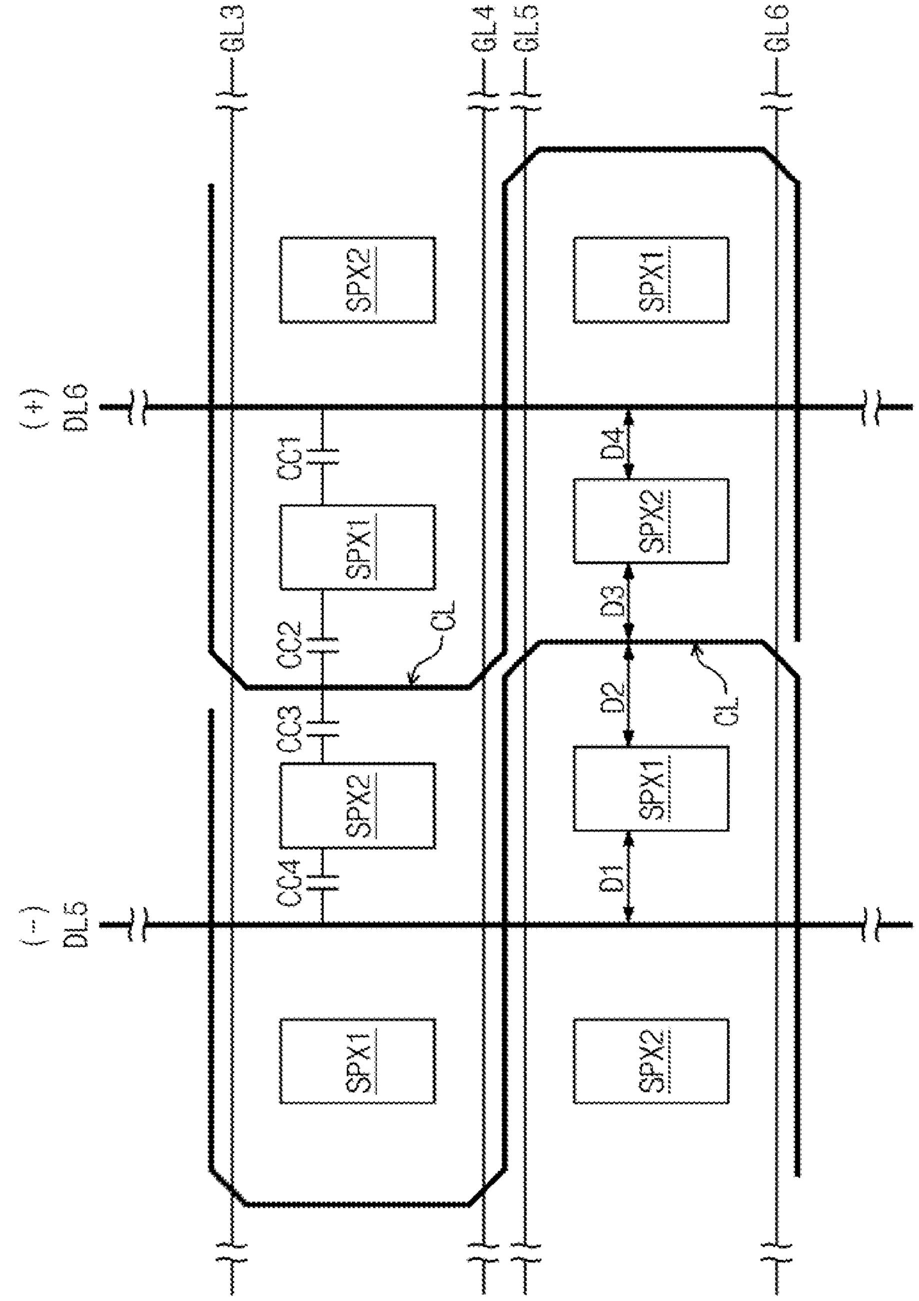
FIG. 7 is a view illustrating a portion of the display panel shown in FIG. 3.

The first source electrode SE1, the connection line CL, and the second source electrode SE2, which are electrically connected to each other one after another, surround the first sub-pixel electrode SPE1 in cooperation with a section of the associated data line (e.g., the seventh data line illustrated in FIG. 7). That is, the first source electrode SE1, the connection line CL, the second source electrode SE2, and the section of the associated data line form a closed signal line to transfer the data voltage.

Each of the first source electrode SE1 and the second source electrode SE2 includes a branch portion BP extending in a first direction and an electrode portion CP connected to the branch portion BP and adjacent to the associated first or second drain electrodes DE1 or DE2. The electrode portion CP is disposed on the associated first or second gate electrodes GE1 or GE2 and the associated first or second active layers AL1 or AL2 to form a channel together with the associated first or second drain electrodes DE1 or DE2. In one or more embodiments, the electrode portion CP partially surrounds the associated drain electrode. For example, three portions of the electrode CP may be disposed substantially parallel to and adjacent to three sides of the associated drain electrode, respectively. The branch portion BP electrically connects the electrode portion CP and the associated data line (e.g., the seventh data line DL7 illustrated in FIG. 3 or the sixth data line DL6 illustrated in FIG. 7) to each other.

Accordingly, the first sub-pixel electrode SPE1 is surrounded or enclosed by a closed connection loop including the associated data line (e.g., the seventh data line DL7 illustrated in FIG. 3 or the sixth data line DL6 illustrated in FIG. 7) and the connection line CL. The second sub-pixel electrode SPE2 is disposed adjacent to and between an unassociated data line (e.g., the sixth data line DL6 illustrated in FIG. 3 or the fifth data line DL5 illustrated in FIG. 7) and the connection line CL, but is not enclosed by the unassociated data line DL5 (e.g., the sixth data line DL6 illustrated in FIG. 3 or the fifth data line DL5 illustrated in FIG. 7) and the connection line CL.

The connection relations between the pixels PX, the gate lines GL1 to GL2*n*, and the data lines DL1 to DLm will be described with reference to FIG. 2.

The set of pixels disposed between the (m)th data line and the (m+1)th data line is defined as an (i) th pixel column. In this case, the "i" is equal to the "m". For instance, the set of pixels PX disposed between a first data line DL1 and a second data line DL2 is defined as a first pixel column, the set of pixels disposed between the second data line DL2 and a third data line DL3 is defined as a second pixel column, and the set of pixels PX disposed between the third data line DL3 and a fourth data line DL4 is defined as a third pixel column.

In addition, the set of pixels having sub-pixel electrodes disposed between the (2n−1)th gate line and the (2n)th gate line is defined as a (j) th pixel row. The "j" and the "n" satisfy the following equation.

Equation $$j=(2n-1)-(n-1)=n$$

For instance, the set of pixels PX having sub-pixel electrodes disposed between a first gate line GL1 and a second gate line GL2 is defined as a first pixel row, and the set of pixels PX having sub-pixel electrodes disposed between a third gate line GL3 and a fourth gate line GL4 is defined as a second pixel row.

The first sub-pixel of a pixel in the nth pixel row and in the (i) th pixel column is connected to the (2n)th gate line, and the second sub-pixel of the pixel in the nth pixel row and in the (i) th pixel column is connected to the (2n−1)th gate line. For instance, as illustrated in FIG. 2, the first sub-pixel SPX1 disposed in the first pixel row and in the first pixel column is connected to the second gate line GL2, and the second sub-pixel SPX2 disposed in the first pixel row and in the first pixel column is connected to the first gate line GL1.

In addition, the first sub-pixel of a pixel in the nth pixel row and in the (i+1)th pixel column is connected to the (2n−1)th gate line, and the second sub-pixel of the pixel in the nth pixel row and in the (i+1)th pixel column is connected to the (2n)th gate line. For instance, as illustrated in FIG. 2, the first sub-pixel SPX1 disposed in the first pixel row and in the second pixel column is connected to the first gate line GL1, and the second sub-pixel SPX2 disposed in the first pixel row and in the second pixel column is connected to the second gate line GL2.

In addition, the first sub-pixel of a pixel in the nth pixel row and in the (i+2)th pixel column is connected to the (2n−1)th gate line, and the second sub-pixel of the pixel in the nth pixel row and in the (i+2)th pixel column is connected to the (2n)th gate line. For instance, as illustrated in FIG. 2, the first sub-pixel SPX1 disposed in the first pixel row and in the third pixel column is connected to the first gate line GL1, and the second sub-pixel SPX2 disposed in the first pixel row and in the third pixel column is connected to the second gate line GL2.

In one or more embodiments, the first sub-pixel disposed in the (i) th pixel column and the second sub-pixel disposed in the (i+1)th pixel column each has a red color filter R. The second sub-pixel disposed in the (i) th pixel column and the first sub-pixel disposed in the (i+2)th pixel column each has a green color filter G. The first sub-pixel disposed in the (i+1)th pixel column and the second sub-pixel disposed in the (i+2)th pixel column each has a blue color filter B. The first sub-pixels and the second sub-pixels are disposed in the same row.

As illustrated in FIG. 2, the first sub-pixel SPX1 disposed in the first pixel row and in the first pixel column and the second sub-pixel SPX2 disposed in the first pixel row and in the second pixel column each has a red color filter R. The second sub-pixel SPX2 disposed in the first pixel row and the first pixel column and the first sub-pixel SPX1 disposed in the first pixel row and the third pixel column each has a green color filter G. The first sub-pixel SPX1 disposed in the first pixel row and the third pixel column and the second sub-pixel SPX2 disposed in the first pixel row and the third pixel column each has a blue color filter B.

Accordingly, three successive sub-pixels disposed in the same row have red, green, and blue color filters, respectively. The color filters are repeated in the unit of three sub-pixels along the pixel row. In addition, the pixels disposed in each pixel column may have color filters having the same color.

The first sub-pixel and the second sub-pixel disposed in the (m)th pixel column and in the (j) th pixel row are connected to the (m)th data line, and the first sub-pixel and the second sub-pixel disposed in the (m)th pixel column and in the (j+1) th pixel row are connected to the (m+1)th data line.

For instance, as shown in FIG. 2, the first and second sub-pixels SPX1 and SPX2 disposed in the first pixel column and in the first pixel row are connected to the first data line DL1, and the first and second sub-pixels SPX1 and SPX2 disposed in first pixel column and in the second pixel row are connected to the second data line DL2.

In one or more embodiments, the first and second sub-pixels disposed in each pixel column and in an odd-numbered pixel row are connected to the (m)th data line, and the first and second sub-pixels disposed in each pixel column and in an even-numbered pixel row are connected to the (m+1)th data line.

Figure 5:
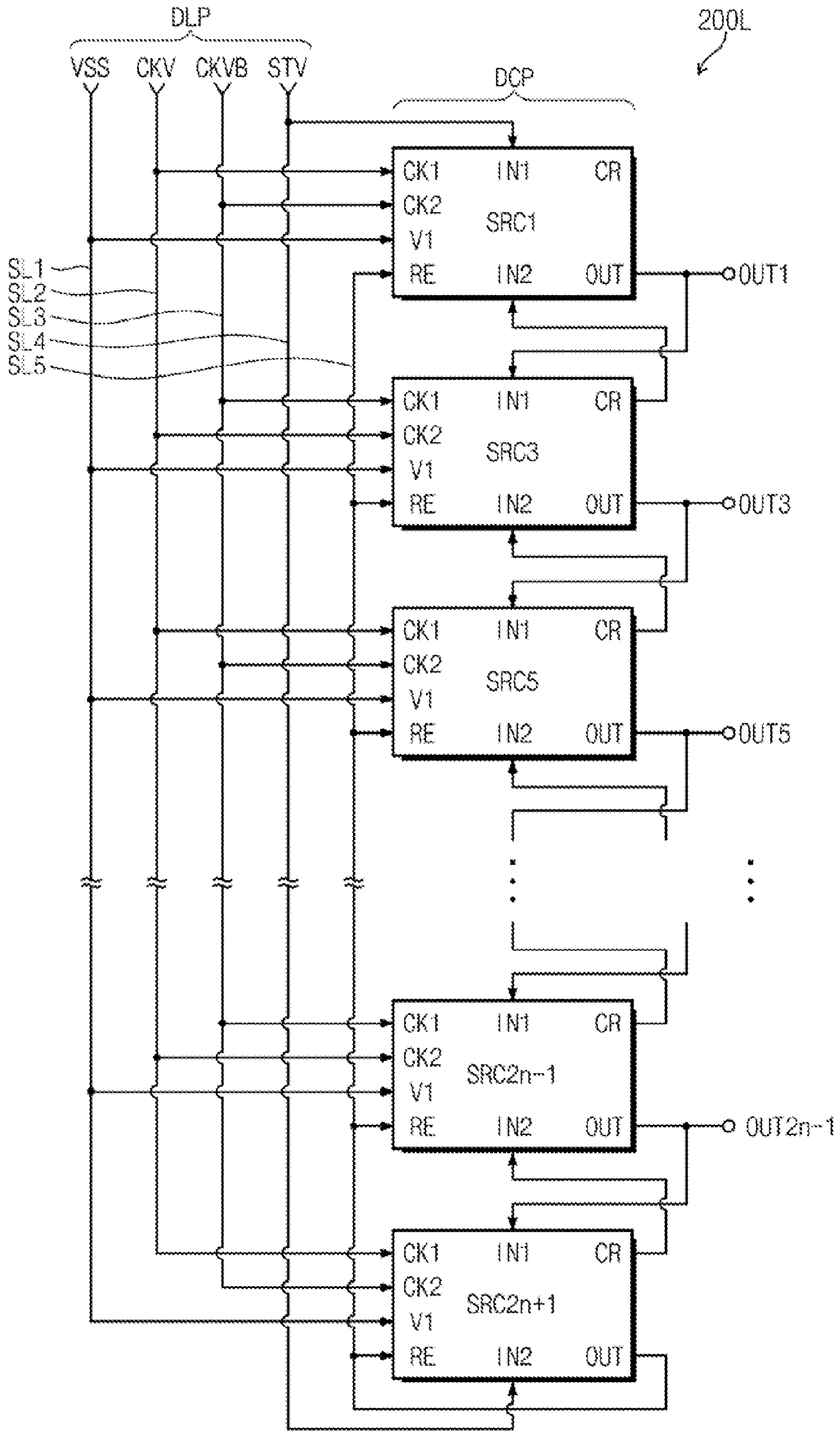
FIG. 5 is a block diagram illustrating a first gate driver illustrated in FIG. 1 according to an embodiment.
Figure 6:
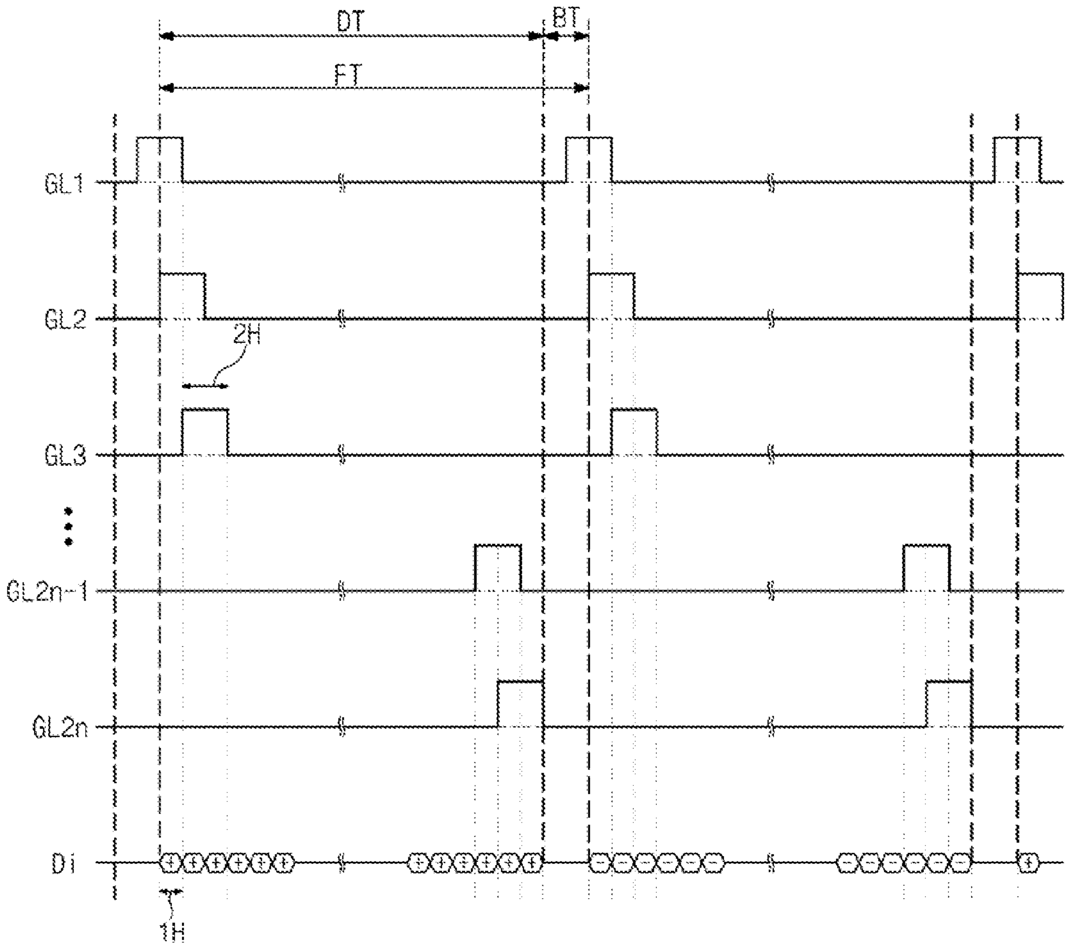
FIG. 6 is a timing diagram illustrating signals applied to a display panel shown in FIG. 1.

Hereinafter, the method of driving the display apparatus will be described with reference to FIGS. 1, 2, 5, and 6. FIG. 5 is a block diagram illustrating a first gate driver shown in FIG. 1 according to an embodiment, and FIG. 6 is a timing diagram illustrating signals applied to a display panel shown in FIG. 1.

Referring to FIG. 5, the first gate driver 200L includes a circuit part DCP and a line part CLP disposed adjacent to the circuit part DCP. The second gate driver 200R have the same structure and function as those of the first gate driver 200L except that the second gate driver 200R outputs the data signal to even-numbered gate lines GL2 to GL2*n*.

The circuit part DCP includes first to (2n−1)th stages SRC1 to SRC2*n*−1 and a dummy stage SRC2*n*+1, which are connected to each other one after another. The first to (2n−1)th stages SRC1 to SRC2*n*−1 sequentially output the gate signals through first to (2n−1)th output terminals OUT1 to OUT2*n*−1. In detail, the first to (2n−1)th output terminals OUT1 to OUT2*n*−1 are connected to the odd-numbered gate lines GL1, GL3, . . . , and GL2*n*−1 of the gate lines GL1 to GL2*n* to apply the gate signals to the odd-numbered gate lines GL1, GL3, . . . , and GL2*n*−1.

Each of the first to (2n−1)th stages SRC1 to SRC2*n*−1 and the dummy stage SRC2*n*+1 includes a first clock terminal CK1, a second clock terminal CK2, a first input terminal IN1, a second input terminal IN2, an off voltage terminal V1, a reset terminal RE, a carry terminal CR, and an output terminal OUT.

The first clock terminal CK1 and the second clock terminal CK2 of each odd-n (e.g., n=1, 3, 5, . . . ) stage among the first to (2n−1)th stages SRC1 to SRC**2*n*−1 and the dummy stage SRC2*n*+1 receive a first clock signal CKV and a second clock signal CKVB, respectively. The first clock terminal CK1 and the second clock terminal CK2 of each even-n (e.g., n=2, 4, 6, . . . ) stage among the first to (2n−1)th stages SRC1 to SRC2*n*−1 and the dummy stage SRC2*n*+1** receive the second clock signal CKVB and the first clock signal CKV, respectively.

The first input terminal IN1 of each of the first to (2n−1)th stages SRC1 to SRC**2*n*−1 and the dummy stage SRC2*n*+1 receives a start signal STV or the gate signal of a previous stage. The second input terminal IN2 of each of the first to (2n−1)th stages SRC1 to SRC2*n*−1 receives a carry signal of a next stage. The second input terminal IN2 of the dummy stages SRC2*n*+1** receives the start signal STV instead of a carry signal of a next stage.

The off voltage terminal V1 of each of the first to (2n−1)th stages SRC1 to SRC**2*n*−1 and the dummy stage SRC2*n*+1 receives a gate-off voltage VSS. The reset terminal RE of each of the first to (2n−1)th stages SRC1 to SRC2*n*−1 and the dummy stage SRC2*n*+1 receives the gate signal output from the dummy stage SRC2*n*+1**.

The first clock signal CKV is output from the carry terminal CR and the output terminal OUT of each of the odd-n stages of the first to (2n−1)th stages SRC1 to SRC**2*n*−1 (except the carry terminal CR of the first stage SRC1) as a carry signal and an output signal, and the second clock signal CKVB is output from the carry terminal CR and the output terminal OUT of each of the even-n stages of the first to (2n−1)th stages SRC1 to SRC2*n*−1 as the carry signal and the output signal. The carry signal output from the carry terminal CR of the even-n stages is applied to the second input terminal IN2 of the previous stage, and the gate signal output from the output terminal OUT of the first to (2n−1)th stages SRC1 to SRC2*n*−1 is applied to the first input terminal IN1** of the next stage.

The line part DLP includes first to fifth signal lines SL1 to SL5. The first to fourth signal lines SL1 to SL4 receive the gate-off voltage VSS, the first clock signal CKV, the second clock signal CKVB, and the start signal STV, respectively, and apply the gate-off voltage VSS, the first clock signal CKV, the second clock signal CKVB, and the start signal STV to the first to (2n−1)th stages (i.e., SRC1, SRC3, . . . , and SRC**2*n*−1) and the dummy stage SRC2*n*+1. The fifth signal line SL5 provides a (2n+1)th gate signal output from the (2n+1)th stage SRC2*n*+1 (i.e., the dummy stage) to the reset terminal RE of each of the first to (2n+1)th stages SRC1, SRC3, . . . , SRC2*n*−1, and SRC2*n*+1**.

As shown in FIG. 6, the gate signals and the data signal are repeatedly applied in the unit of a frame time FT, and the signal timing of two frame times has been illustrated in FIG. 6.

The frame time FT includes a data input time DT and a blank time BT. The data input time DT indicates a time during which the data voltage is substantially applied to the data lines DL1 to DLm, and the black time BT indicates a time during which the data voltage of a next frame is prepared to be applied to the data lines DL1 to DLm.

The data voltage is applied to the data lines DL1 to DLm during the data input time DT, and FIG. 6 shows the data voltage applied to the (m)th data line, wherein m=i. The data voltage is sequentially applied to the (m)th data line every horizontal period (1H).

Each of the gate signals includes a high period (e.g., the gate-on signal) of 2H time in every frame and the high period of the gate signals is sequentially generated in the unit of 1H time. Accordingly, high periods of two gate signals applied to two adjacent gate lines overlap each other during 1H time.

Among the high period of 2H of each of the gate signals, a first 1H time is used to pre-charge the pixels and a second 1H time is used to apply the data voltage to the pixels. In detail, among the high period of 2H of the gate signal applied to the second gate line GL2, the first 1H time overlaps the second 1H of the gate signal applied to the first gate line GL1. Thus, the data voltage is substantially applied to the pixels connected to the first gate line GL1 wherein the pixels connected to the second gate line GL2 are pre-charged to receive the next data voltage.

A pre-charge driving method, in which the gate-on signal is applied to the next gate line when the gate-on signal is applied to the present gate line according to an embodiment of the invention, has been described, but the driving method should not be limited to the pre-charge driving method. In addition, the first and second gate drivers 200L and 200R are mounted on the display panel DP as described with reference to FIG. 2, but they should not be limited thereto or thereby. Further, although not shown in FIG. 2, the data driver 300 may be connected to the display panel DP through a plurality of tape carrier packages each of which includes a driving chip mounted thereon.

The display apparatus applies the data voltage to the (m)th data line and the (m+1)th data line in the unit of the frame time FT among the frames, wherein the polarity of the data voltage may change with respect to a predetermined reference voltage. In the present embodiment, the predetermined reference voltage may be a ground voltage applied to the common electrode CE.

For instance, the data voltage applied to the (m)th data line shown in FIG. 6 may have a first polarity with respect to the reference voltage during a present frame. The first polarity of the data voltage is positive (+). In addition, the data voltage applied to the (m)th data line shown in FIG. 6 may have a second polarity with respect to the reference voltage during a next frame. The second polarity of the data voltage is negative (−).

During the frame time FT in the present frame of the frames, the data voltage applied to the (m)th data line and the data voltage applied to the (m+1)th data line may have different polarities with respect to the reference voltage, wherein the (m)th data line may receive a data voltage having a first polarity, and the (m+1)th data line may receive a data voltage having a second polarity opposite to the first polarity. That is, the polarity of the data voltages applied to the data lines DL1 to DLm is inverted every column.

For instance, as shown in FIG. 2, the data voltage having the negative (−) polarity is applied to the odd-numbered data lines DL1, DL3, DL5, and DL7, and the data voltage having the positive (+) polarity is applied to the even-numbered data lines DL2, DL4, and DL6.

In the display apparatus according to one or more embodiments, the data lines DL1 to DLm receive data voltages having polarity inverted in the unit of a column. As will be explained with reference to FIG. 7, embodiments of the invention take advantage of the polarity inversion to minimize the influence of parasitic capacitances on data voltages, thereby advantageously achieving desirable gray-scales and improving image quality.

FIG. 7 is a view illustrating the first sub-pixel SPX1 and the second sub-pixel SPX2 shown in FIG. 3. Particularly, among the pixels having sub-pixel electrodes disposed between the third gate line GL3 and the fourth gate line GL4, the pixel PX applied with the data voltage from the sixth data line DL6 will be mainly described in detail.

The first sub-pixel electrode SPE1 and the second sub-pixel electrode SPE2 receive a data voltage having the positive (+) polarity from the sixth data line DL6. A data voltage having the negative (−) polarity is applied to the fifth data line DL5.

A first parasitic capacitance CC1 is generated between the first sub-pixel electrode SPE1 and the sixth data line DL6, and a second parasitic capacitance CC2 is generated between the first sub-pixel electrode SPE1 and the connection CL (refer to FIGS. 3 and 4).

A third parasitic capacitance CC3 is generated between the second sub-pixel electrode SPE2 and the connection line CL and a fourth parasitic capacitance CC4 is generated between the second sub-pixel electrode SPE2 and the fifth data line DL5.

The total amount of the parasitic capacitance generated in the first sub-pixel SPX1 is substantially uniform regardless of the respective distances between the first sub-pixel electrode SPE1 and the sixth data line DL6 and between the first sub-pixel electrode SPE1 and the connection line CL if the sum of the two distances is substantially constant. That is, the first sub-pixels PX included in the display panel DP may have a substantially uniform parasitic capacitance.

The third parasitic capacitance CC3 generated in the second sub-pixel SPX2 and the fourth parasitic capacitance CC4 generated in the second sub-pixel SPX2 are offset with each other, given that the opposite polarities of the data voltages applied to the fifth and sixth data lines DL5 and DL6. Accordingly, the second sub-pixel SPX2 may display a gray-scale corresponding to the data voltage applied thereto.

Given the parasitic capacitances CC1 and CC2, without proper configuration, the first sub-pixel SPX1 may display a gray-scale brighter or darker than the gray-scale intended by the data voltage applied thereto. In order to display the gray-scale corresponding to the data voltage applied to the first sub-pixel SPX1, a second distance D2 between the first sub-pixel electrode SPE1 and the connection line CL is longer than a third distance D3 between the second sub-pixel electrode SPE2 and the connection line CL when viewed in a plan view of the display panel (DP), such that the second parasitic capacitance CC2 may be minimized.

In addition, a first distance between the first sub-pixel electrode SPE1 and the data line disposed adjacent to the first sub-pixel SPX1 is longer than a fourth distance D4 between the second sub-pixel electrode SPE2 and the data line disposed adjacent to the second sub-pixel SPX2 (in a plan view of the display panel), such that the first parasitic capacitance CC1 may be minimized. This is to reduce the total amount of the parasitic capacitance generated in the first sub-pixel SPX1.

Table 1 shows a difference value between the gray-scale in the first sub-pixel SPX1 and the gray-scale in the second sub-pixel SPX2 according to the first, second, third, and fourth distances D1, D2, D3, and D4. The difference value of the gray-scales means the difference value of the gray-scale level of a desired image and the gray-scale level of a displayed image.

TABLE 1

| | Distance (μm) | Difference value of gray-scales |
|---|---|---|
| First display apparatus | D1 = 2.75 | SPX1 = 0.5 |
| | D4 = 2.75 | SPX2 = −0.5 |
| Second display apparatus | D1 = 2.75 | SPX1 = 0.9 |
| | D2 = 2.75 | SPX2 = 0 |
| | D3 = 2.75 | |
| | D4 = 2.75 | |
| Third display apparatus | D1 = 3 | SPX1 = 0.5 |
| | D2 = 3 | SPX2 = 0 |
| | D3 = 2.75 | |
| | D4 = 2.75 | |
| Fourth display apparatus | D1 = 3.25 | SPX1 = 0.3 |
| | D2 = 3.25 | SPX2 = 0 |
| | D3 = 2.75 | |
| | D4 = 2.75 | |

According to Table 1, the first sub-pixel SPX1 in the first display apparatus not employing the connection line CL displays the image brighter than the desired gray-scale level by about 0.5, and the second sub-pixel SPX2 in the first display apparatus not employing the connection line CL displays the image darker than the desired gray-scale level by about −0.5.

In the second display apparatus in which the first, second, third, and fourth distances D1, D2, D3, and D4 have the same value, the first sub-pixel SPX1 displays the image brighter than the desired gray-scale level by about 0.9 even though the second sub-pixel SPX displays the image at the desired gray-scale level.

In the third and fourth display apparatuses, the second sub-pixel SPX2 displays the image at the desired gray-scale level and the first sub-pixel SPX1 has the difference value of the gray-scales, which is equal to or smaller than that of the first sub-pixel SPX1 of the first display apparatus. As the first and second distances D1 and D2 increase, the image display in the first sub-pixel SPX1 is close to the image having the desired gray-scale level. Thus, the display quality of the image displayed in the display panel DP may be improved.

Although embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display apparatus comprising:

a plurality of gate lines including a first gate line and a second gate line neighboring the first gate line;

a plurality of data lines crossing the gate lines, insulated from the gate lines, and including a first data line and a second data line neighboring the first data line;

a plurality of pixels that includes a first pixel, the first pixel including a first sub-pixel and a second sub-pixel, the first sub-pixel including a first sub-pixel electrode, the second sub-pixel including a second sub-pixel electrode, both the first sub-pixel electrode and the second sub-pixel electrode being disposed between the first gate line and the second gate line in a plan view of the display apparatus and being disposed between the first data line and the second data line in the plan view of the display apparatus, the first sub-pixel being electrically connected to each of the second gate line and the first data line, the second sub-pixel being electrically connected to each of the first gate line and the first data line; and a connection line electrically connected to each of the first data line, the first sub-pixel, and the second sub-pixel, and wherein at least a portion of the connection line is disposed between the first sub-pixel electrode and the second sub-pixel electrode in the plan view of the display apparatus, and the portion of the connection line does not overlap the gate lines, wherein a first distance which is a shortest distance between the first sub-pixel electrode and the portion of the connection line is longer than a second distance which is a shortest distance between the second sub-pixel electrode and the portion of the connection line in a plan view of the display apparatus, wherein a third distance which is a shortest data line distance between the first sub-pixel electrode and the first data line is longer than a fourth distance which is a shortest distance between the second sub-pixel electrode and the second data line, and wherein the shortest distance is measured in a direction parallel to a direction the gate lines extend in.

2. The display apparatus of claim 1, wherein the first sub-pixel further includes a first transistor electrically connected to the first sub-pixel electrode, the second gate line, and the first data line.

3. The display apparatus of claim 2, wherein the second sub-pixel further includes a second transistor electrically connected to the second sub-pixel electrode, the first gate line, and the first data line.

4. The display apparatus of claim 3, further comprising:

a common electrode facing the first sub-pixel electrode and the second sub-pixel electrode; and a liquid crystal layer disposed between the first sub-pixel electrode and the common electrode and between the second sub-pixel electrode and the common electrode.

5. The display apparatus of claim 3, wherein the first transistor comprises a first source electrode connected to the first data line and a first drain electrode spaced apart from the first source electrode and electrically connected to the first sub pixel electrode, and the second transistor comprises a second source electrode connected to the first data line and a second drain electrode spaced apart from the second source electrode and electrically connected to the second sub pixel electrode.

6. The display apparatus of claim 5, wherein the connection line electrically connects the first source electrode and the second source electrode to each other.

7. The display apparatus of claim 6, wherein the first source electrode comprises a first branch portion extending in a first direction and a first electrode portion connected to the first branch portion and adjacent to the first drain electrode, the second source electrode comprises a second branch portion extending in the first direction and a second electrode portion connected to the second branch portion and adjacent to the second drain electrode, and the connection line electrically connects the first electrode portion and the second electrode portion to each other.

8. The display apparatus of claim 7, wherein the first sub-pixel electrode is disposed between the first branch portion and the second branch portion in the plan view of the display apparatus.

9. The display apparatus of claim 1, wherein the plurality of data lines further includes a third data line and a fourth data line, and a fifth data line sequentially disposed following the first data line and the second data line, the plurality of pixels further includes a second pixel, a third pixel, and a fourth pixel, the second pixel including a third sub-pixel and a fourth sub-pixel each having a sub-pixel electrode disposed between the second data line and the third data line, the third pixel including a fifth sub-pixel and a sixth sub-pixel each having a sub-pixel electrode disposed between the third data line and the fourth data line, the fourth pixel including a seventh sub-pixel and an eighth sub-pixel each having a sub-pixel electrode disposed between the fourth data line and the fifth data line, the third sub-pixel and the fourth sub-pixel are electrically connected to the second data line, the fifth sub-pixel and the sixth sub-pixel are electrically connected to the third data line, and the seventh sub-pixel and the eighth sub-pixel are electrically connected to the fourth data line.

10. The display apparatus of claim 9, wherein each of the first sub-pixel, the fourth sub-pixel, and the seventh sub-pixel includes a first-color filter and is electrically connected to the second gate line.

11. The display apparatus of claim 10, wherein each of the second sub-pixel, the fifth sub-pixel, and the eighth sub-pixel includes a second-color filter and is electrically connected to the first gate line.

12. The display apparatus of claim 11, wherein each of the third sub-pixel and the sixth sub-pixel includes a third-color filter, the third sub-pixel is electrically connected to the first gate line, and the sixth sub-pixel is electrically connected to the second gate line.

13. The display apparatus of claim 10, wherein the plurality of gate lines further includes a third gate line and a fourth gate line sequentially disposed following the first gate line and the second gate line, the plurality of pixels further includes a fifth pixel that includes a ninth sub-pixel and a tenth sub-pixel each having a sub-pixel electrode disposed between the first data line and the second data line and between the third gate line and the fourth gate line, each of the ninth sub-pixel and the tenth sub-pixel is electrically connected to the second data line, the ninth sub-pixel includes a corresponding first-color filter and is electrically connected to the fourth gate line, and the tenth sub-pixel includes a corresponding second-color filter and is electrically connected to the third gate line.

14. The display apparatus of claim 1, wherein in a first frame the first data line receives a first data voltage having a first polarity, and in the first frame the second data line receives a second data voltage having a second polarity different from the first polarity.

15. The display apparatus of claim 14, wherein in a second frame following the first frame the first data line receives a third data voltage having the second polarity, and in the second frame the second data line receives a fourth data voltage having the first polarity.

16. The display apparatus of claim 1, further comprising:

a first gate driver that outputs a gate signal to the first gate line;

a second gate driver that outputs the gate signal to the second gate line;

a data driver that applies the data voltage to the first data line and the second data line; and a timing controller that outputs a gate control signal to the first and second gate drivers and outputs an image signal and a data control signal to the data driver.

17. The display apparatus of claim 16, wherein the first gate driver comprises at least one stage circuit to apply the gate signal to the first gate line, and the second gate driver comprises at least one stage circuit to apply the gate signal to the second gate line.

18. A display apparatus comprising:

a plurality of gate lines including a first gate line and a second gate line neighboring the first gate line;

a plurality of data lines crossing the gate lines, insulated from the gate lines, and including a first data line and a second data line neighboring the first data line;

a first sub-pixel and a second sub-pixel, the first sub-pixel including a first sub-pixel electrode, the second sub-pixel including a second sub-pixel electrode, both the first sub-pixel electrode and the second sub-pixel electrode being disposed between the first gate line and the second gate line in a plan view of the display apparatus and being disposed between the first data line and the second data line in the plan view of the display apparatus, the first sub-pixel being electrically connected to each of the second gate line and the first data line, the second sub-pixel being electrically connected to each of the first gate line and the first data line; and a signal line including a portion of the first data line and enclosing the first sub-pixel in a plan view of the display apparatus, wherein a first distance which is a shortest distance between the first sub-pixel electrode and the signal line is longer than a second distance which is a shortest distance between the second sub-pixel electrode and the signal line in a plan view of the display apparatus, wherein a third distance which is a shortest distance between the first sub-pixel electrode and the first data line is longer than a fourth distance which is a shortest distance between the second sub-pixel electrode and the second data line, and wherein the shortest distance is measured in a direction parallel to a direction the gate lines extend in.

* * * * *